United States Patent
Vogt et al.

(10) Patent No.: US 8,881,589 B2
(45) Date of Patent: Nov. 11, 2014

(54) FLOAT FOR DISPLAYING A FILL LEVEL

(75) Inventors: Michael Vogt, Bochum (DE); Uwe Wegemann, Moers (DE)

(73) Assignee: KROHNE Messtechnik GmbH, Duisburg (DE)

(*) Notice: Subject to any disclaimer, the term of this patent is extended or adjusted under 35 U.S.C. 154(b) by 263 days.

(21) Appl. No.: 13/443,033

(22) Filed: Apr. 10, 2012

(65) Prior Publication Data

US 2013/0000401 A1 Jan. 3, 2013

(30) Foreign Application Priority Data

Jun. 28, 2011 (DE) .......................... 10 2011 106 568

(51) Int. Cl.
*G01F 23/284* (2006.01)
*G01F 23/72* (2006.01)
*G01F 23/68* (2006.01)
*G01F 23/76* (2006.01)

(52) U.S. Cl.
CPC .............. *G01F 23/76* (2013.01); *G01F 23/284* (2013.01); *G01F 23/72* (2013.01); *G01F 23/68* (2013.01)
USPC .......................................................... 73/305

(58) Field of Classification Search
CPC ... G01F 23/284; G01F 23/303; G01F 23/306; G01F 23/64
USPC ..................................... 73/305, 290 V, 290 R
See application file for complete search history.

(56) References Cited

U.S. PATENT DOCUMENTS

| | | | | |
|---|---|---|---|---|
| 4,585,317 A * | 4/1986 | Hodges et al. | ................. | 359/852 |
| 4,641,139 A * | 2/1987 | Edvardsson | ................. | 342/124 |
| 5,474,198 A * | 12/1995 | Edvardsson | ................. | 220/216 |
| 5,614,831 A * | 3/1997 | Edvardsson | ................. | 324/642 |
| 6,795,015 B2 * | 9/2004 | Edvardsson | ................. | 342/124 |
| 2005/0241391 A1 | 11/2005 | Kull | | |
| 2008/0210003 A1* | 9/2008 | Schulz | ........................ | 73/290 V |
| 2010/0089148 A1* | 4/2010 | Soraker et al. | ................. | 73/305 |

FOREIGN PATENT DOCUMENTS

| | | |
|---|---|---|
| EP | 0 715 368 A1 | 6/1996 |
| JP | 62-039801 A | 2/1987 |
| JP | 02-054031 A | 2/1990 |
| WO | 2008/086543 A2 | 7/2008 |

* cited by examiner

*Primary Examiner* — Hezron E Williams
*Assistant Examiner* — Xin Zhong
(74) *Attorney, Agent, or Firm* — Roberts Mlotkowski Safran & Cole, P.C.; David S. Safran

(57) ABSTRACT

A float for displaying the fill level of a medium (3) in a container (2), wherein the float (1), in the intended use, is guided by the wall of the container (2, 4) and is suitable for reflecting electromagnetic waves emitted from a transmitter (5) toward a receiver (6). The float has improved electromagnetic wave reflecting characteristics regardless of whether or not the float is tilted in that, in the intended use, at least the end of the float facing the transmitter (5) is a reflector (20) for reflecting electromagnetic waves to the receiver (6) and that a field attenuation structure (8) is located behind the reflector (20) from the perspective of the transmitter (5) in such a manner that electromagnetic waves interacting with the field attenuation structure (8) are attenuated.

14 Claims, 5 Drawing Sheets

FLOAT FOR DISPLAYING A FILL LEVEL

BACKGROUND OF THE INVENTION

1. Filed of the Invention

The invention relates to a float for displaying the fill level of a medium in a container, wherein the float, in the intended use, is guided from the wall of the container and is suitable for reflecting electromagnetic waves emitted from a transmitter toward a receiver.

2. Description of Related Art

Floats of the above mentioned type are used, in practice, for fill level measurement based on the radar principle in order to bring about a defined reflection behavior in the area of the surface of the medium whose fill level is to be measured. As is generally known, the reflection factor of electromagnetic waves is dependent on—not only, but also—refraction indices of the media forming the interfaces, and thus, on their permeability and permittivity. The amplitude of the electromagnetic waves reflected without a float is thus dependent on the material characteristics of the media involved, and thus, is dependent on each specific use of a fill level measuring device. In particular, when only the medium interface is used as a reflection surface, the ratio of desired signal intensity to interference signal intensity practically cannot be predicted, which makes it difficult to design a fill level measuring device. These difficulties are alleviated by the use of the above-mentioned float since the reflection of electromagnetic waves is defined by the nature of floats which, in particular, is better than the reflection from media of low permittivity.

Electromagnetic waves emitted from the transmitter, which is normally found above the medium, toward the medium are reflected by the float, which partially extends into the medium, and the reflected waves are received by the receiver, which is also normally found above the medium. Finally, the fill level is calculated using known radar methods. In one of these methods, the fill level is determined from the running time of an electromagnetic pulse. In another method, the frequency of a continual electromagnetic signal is modulated in such a manner that the fill level can be determined using the frequency difference between the emitted and received frequencies (modulated continuous wave).

The float is often located in a reference container, which is normally a long hollow body with relative small cross section surface, wherein the walls of the reference container guide the float. The reference container is normally located inside of the container or next to the container in which the medium is found, whose level is to be determined and the longitudinal axis of the reference container is essentially directed toward the force of gravity. The reference container is connected to the container in such a manner that the fill level of the medium in the reference container coincides with the fill level of the medium in the container (see, FIG. 1).

Due to the small cross section of the surface of the hollow body and due to the mass of the float, interference in the stillness of medium that can occur during filling and removing of the medium are reduced and the measuring accuracy is increased in this manner. On the upper end of the reference container, there is normally a transmitter as well as a receiver for the electromagnetic waves and the reference container is often used as a waveguide for the electromagnetic waves. The floats are often provided with a magnet system and next to the reference container, there is an additional display for the fill level by means of magnetic flap or by means of a display magnet. Displaying the fill level occurs, then, using two independent systems and increases reliability using redundancy, which, however, is presently not an issue.

Floats known from the prior art have a surface on which the electromagnetic waves are reflected. The clearance basically necessary for the float being guided by the walls of the container causes an unforeseeable tilting of the float, through which the reflection characteristics are changed. In this manner, unforeseeable reflections of the electromagnetic waves can occur in the gap created by this tilting between the walls of the container and the float, which detrimentally influences measurement.

SUMMARY OF THE INVENTION

A primary object of the present invention is to provide a float that has improved reflection characteristics for the electromagnetic waves, in particular is not dependent on whether the float is tilted or not and which is preferably compatible with existing floats equipped with magnet systems.

The float according to the invention in which the above object is met, is initially and essentially wherein, in the intended use, at least the side of the float facing the transmitter is designed as a reflector for reflecting electromagnetic waves to the receiver and that a field attenuation structure is located behind the reflector from the perspective of the transmitter in such a manner that field intensity in the area of the field attenuating structure is attenuated with respect to the situation in which the field attenuation structure is not provided. Here, it is of little importance which physical effect causes such field attenuation, for example, it can be achieved using transformation of the state of the field and/or caused by damping the electromagnetic waves reaching the area of the field attenuation structure. In the case of transformation of the state of the field, the proportion of energy can be in favor of the reflected electromagnetic waves, while, in the case of damping of the electromagnetic waves in the area of the field attenuation structure, the proportion of energy of the reflected wave remains practically unchanged, but the energy from interfering reflections is reduced. Both exemplary variations can, of course, be combined with one another.

The use of the float according to the invention with developed reflection and field attenuating structures, in comparison to the use of the float known from the prior art, has the advantage of improved reflection characteristics essentially independent of the tilting of the float. The side of the float facing the transmitter and designed as a reflector for reflecting electromagnetic waves to the receiver generates the actual desired signal that is to be used for distance, and thus, fill level determination.

All components of the float are to be preferably made of such materials that are resistant to the medium whose level is measured in the container and are to have good reflection characteristics for electromagnetic waves. In particular, the density of the float in its entirety should be less than that of the medium whose level is to be measured.

In a preferred design of the invention, it is provided that the reflection characteristics are optimized using a flat or curved design, from the perspective of the transmitter of the electromagnetic waves, of the surface of the reflector.

In a particularly preferred design of the invention, it is provided that the float consists of a floating body and a field attenuating structure attached to it. The dimensions of the floating body and the field attenuating structure are chosen so that the floating body comes into contact with the walls of the container when the float tilts in the container, but the field attenuating structure does not come into contact with the walls of the container. In this manner, electrical charges are discharged, which prevents the risk of explosion in explosive media.

In a further preferred design of the invention, the field attenuating structure is implemented as a λ/4 filter (λ is the wavelength of the electromagnetic waves used), in which field attenuation is caused by destructive overlay of the electromagnetic waves that have reached the area of the field attenuating structure. Such a λ/4 filter transforms the state of the field in the gap between the reflector and the field attenuating structure, on the one hand, and the wall of the container, on the other hand, in such a manner that a large portion of the electromagnetic waves is reflected; as in other filters based on interference, energy does not get "lost", and no electromagnetic field is damped in the classical sense. The field attenuating structure designed as a λ/4 filter practically also acts as a reflector, there is a nearly complete reflection on the surface of the reflector, as would result in a "short-circuit" with a completely closed metallic wall.

A preferred implementation of a λ/4 filter comprises large discs and small discs preferably arranged coaxially and alternately, one after the other in the direction of propagation of electromagnetic waves emitted from the transmitter, which together form a λ/4 filter. The discs—viewed in the direction of wave propagation—have a thickness of about an odd multiple of a quarter of the wavelength of the electromagnetic waves used.

In an alternative design, the float comprises a field attenuating structure and a reflector, wherein the field attenuating structure also takes over the tasks of the float. A separate floating body is omitted. Such a float is very compact and tends to tilt overall less often than a float with a "fitted" field attenuating structure.

In a further advantageous design, at least one of the small discs is surrounded by at least one ring of at least one dielectric material. Such a ring influences the interaction of the electromagnetic wave with the field attenuating structure in an advantageous manner because, due to the further interface, the guiding of the wave can be specifically influenced in the field attenuating structure. In a further development of the invention, it is provided that, in particular, the reflector and the field attenuating structure are encased in a dielectric material. This casing influences the reflection and the damping of the electromagnetic waves in an advantageous manner, furthermore, such a casing can also be designed to protect against corrosion.

A further advantage exists in that a field attenuating structure having a jagged geometry can be equipped with a smoother contour, which inter alia, effectively aids in avoiding the undesired sticking of the medium to the float.

In an alternative design, the expansion of the discs is not circular, through which the reflecting and damping characteristics of the float can be adapted for the electromagnetic waves, for example to the geometry of the container.

In detail, there are a plurality of possibilities for designing and further developing the float according to the invention. In this matter, reference is made to the description of preferred embodiments in conjunction with the accompanying drawings.

DETAILED DESCRIPTION OF THE INVENTION

Figure 1:
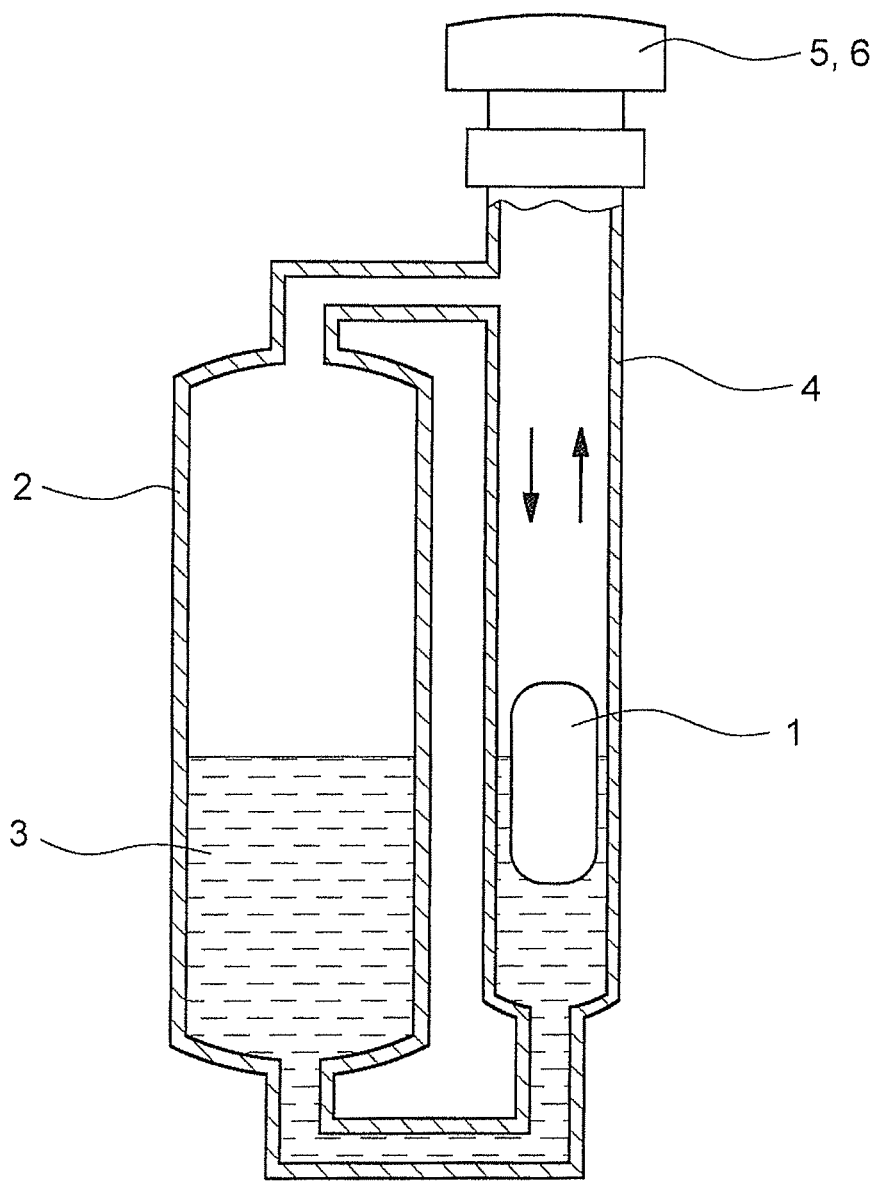
FIG. 1 an embodiment of a float known from the prior art, which is part of a fill level measuring device.

A typical application for a float 1 known from the prior art is shown in FIG. 1, with the aid of which the fill level of a medium 3 found in a container 2, is to be determined. For this, a reference container 4 is joined to the container 2 in such a manner that the fill level of the medium 3 in the container 2 corresponds to the fill level of the medium 3 in the reference container 4. The float 1 corresponding to the prior art floats in the medium 3 in the reference container 4, partially extending out of the medium 3. The float 1 is guided on the side walls of the reference container 4, so that it can only move in the direction of the longitudinal axis of the reference container 4. However, there is clearance present between the float 1 and the walls of the reference container 4, which results in an unavoidable and unforeseeable tilting of the float 1 in the reference container 4.

A fill level measuring device 5, 6 operating with electromagnetic waves according to the radar principle has a transmitter 5 and a receiver 6 for electromagnetic waves. The transmitter 5 emits electromagnetic waves that are essentially propagated along the longitudinal axis of the reference container 4 toward the float 1. The reference container 4 acts as a waveguide for the electromagnetic waves. The part of the float 1 that extends out of the medium 3 and is oriented essentially perpendicular to the longitudinal axis of the reference container 4 regardless of tilting, is a reflector for the waves emitted by the fill level measuring device 5, 6.

The necessary circumferential gap between the float 1 and the walls of the reference container 4 has undesired characteristics in that it favors the creation of interfering reflections which are detrimental to precise measurement of the fill level. Additionally, due to the unavoidable and unforeseeable tilting of the float 1 in the reference container 4, imbalances are created in the gap mentioned, which also disadvantageously influence the reflected electromagnetic waves.

FIGS. 2 to 5 schematically represented embodiments of the float 1 according to the invention, with which, due to field transformation, reflecting characteristics are obtained that are significantly improved in comparison with the prior art shown in FIG. 1.

Figure 2A:
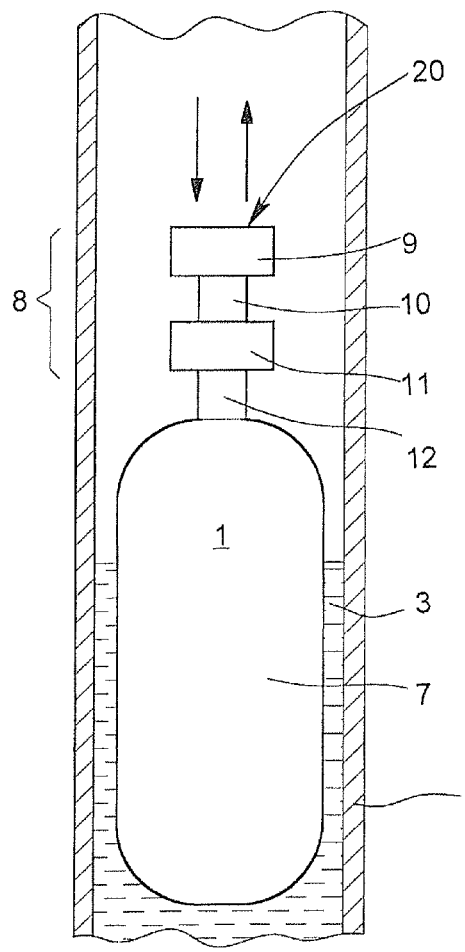
FIG. 2a is a side view of an embodiment of a float according to the invention in a container.
Figure 2B:
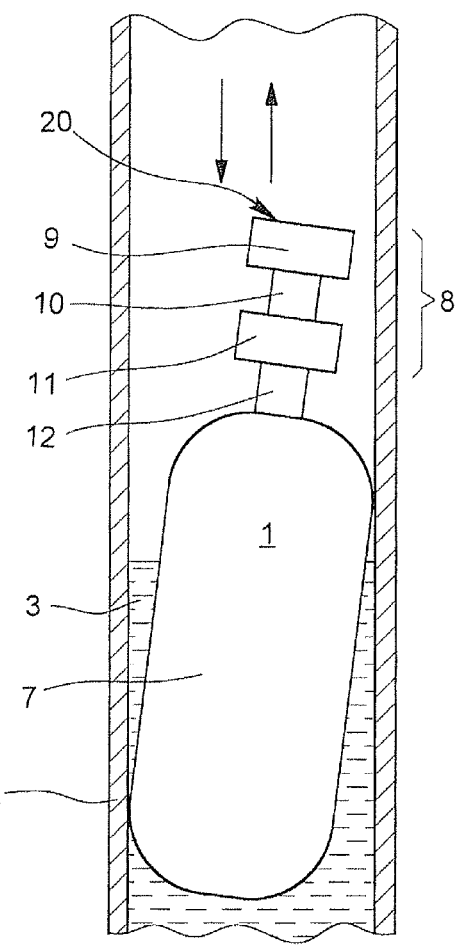
FIG. 2b is a side view of the float according to FIG. 2a in a tilted position.
Figures 3A, 3B:
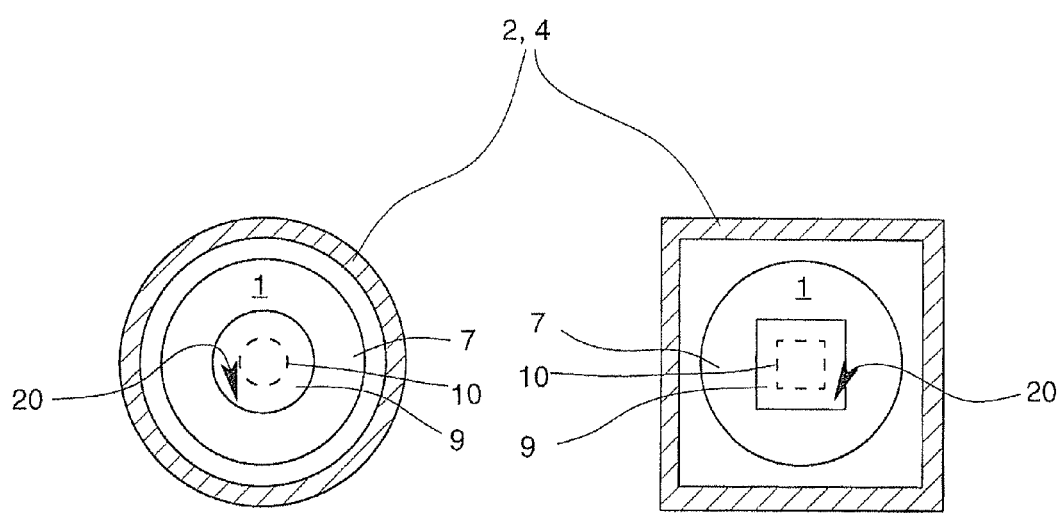
FIG. 3a is a top view of the float according to FIG. 2.
FIG. 3b is a top view of a further embodiment of a float according to the invention.

The embodiment of the float 1 according to the invention shown in FIGS. 2a, 2b and 3a comprises cylinder-shaped floating bodies 7, in which the edges present in an ideal cylinder are, however, blunt. The floating body 7 is adapted to the inner diameter of the reference container 4, with the exception of the necessary gap. A field attenuating structure 8 is connected to the part of the floating body 7 extending out of the medium 3. Here, the floating body 7 is designed like a float known from the prior art, which is equipped with a magnet system not shown here. For this reason, the float 1 according to the invention can be equipped with an existing magnet system, through which it is compatible with existing fill level measuring systems that display the fill level, for example, using magnet flaps or a display magnet.

The field attenuating structure 8 comprises discs 9-12 that are concentric to the longitudinal axis of the floating body 7 with a sequence, viewed from the fill level measuring device 5 of a disc 9 with a large diameter, a disc 10 with a small diameter, a disc 11 with a large diameter and a disc 12 with a small diameter, i.e., an alternating series of two discs 10, 12 with small diameters and two discs 9, 11 with large diameters. The diameter of the large discs 9, 11 is substantially greater than the small discs 10, 12. The thickness of each of the discs 9-12 is essentially a quarter of the wavelength of the electromagnetic wave used; alternatively, the thickness of each disc can be essentially an odd multiple of a quarter of the wavelength of the electromagnetic wave used.

The discs 9-12, together with the part of the surface of the floating body 7 that is largely parallel to the level surfaces of the discs 9-12, form a λ/4 filter. In an alternative design not shown here, the thickness of the disc 12 is essentially greater than a quarter of the wavelength, through which only the discs 9-11 form a λ/4 filter. The level surface of the large disc 9, which is located nearest the fill level measuring device 5, 6, forms a reflector 20 for the electromagnetic waves emitted from the transmitter of the fill level measuring device. In FIG. 2b, the float 1 is tilted in the reference container 4. The diameters of the discs 9-12 are chosen so that none of the discs 9-12 can come into contact with the reference container 4.

Due to the field attenuating structure 8, the reflecting characteristics of the float 1 according to the invention are better than floats according to the prior art, in the tilted state as well as in the non-tilted state. Notably, the reflecting characteristics of the float 1 according to the invention are practically unvaryingly good in the tilted state as well as in the non-tilted state. Due to the design of the field attenuating structure 8 as a λ/4 filter, a large portion of the radiated output is reflected again, the part of the reflected electromagnetic radiation is, in relation to the overall radiated energy, much greater than in the case of the design of the field attenuating structure as a pure damping structure. In the latter, the signal to noise ratio is improved, but the actual desired signal is not increased.

In the embodiment shown in FIG. 3b, a floating body 7 with a round cross section is guided through the walls of a reference container 4 with a rectangular cross section, the geometry of the discs 9, 10 of the field attenuating structure 8 which are perpendicular to the longitudinal axis of the reference container 4 are also rectangular.

Figure 4:
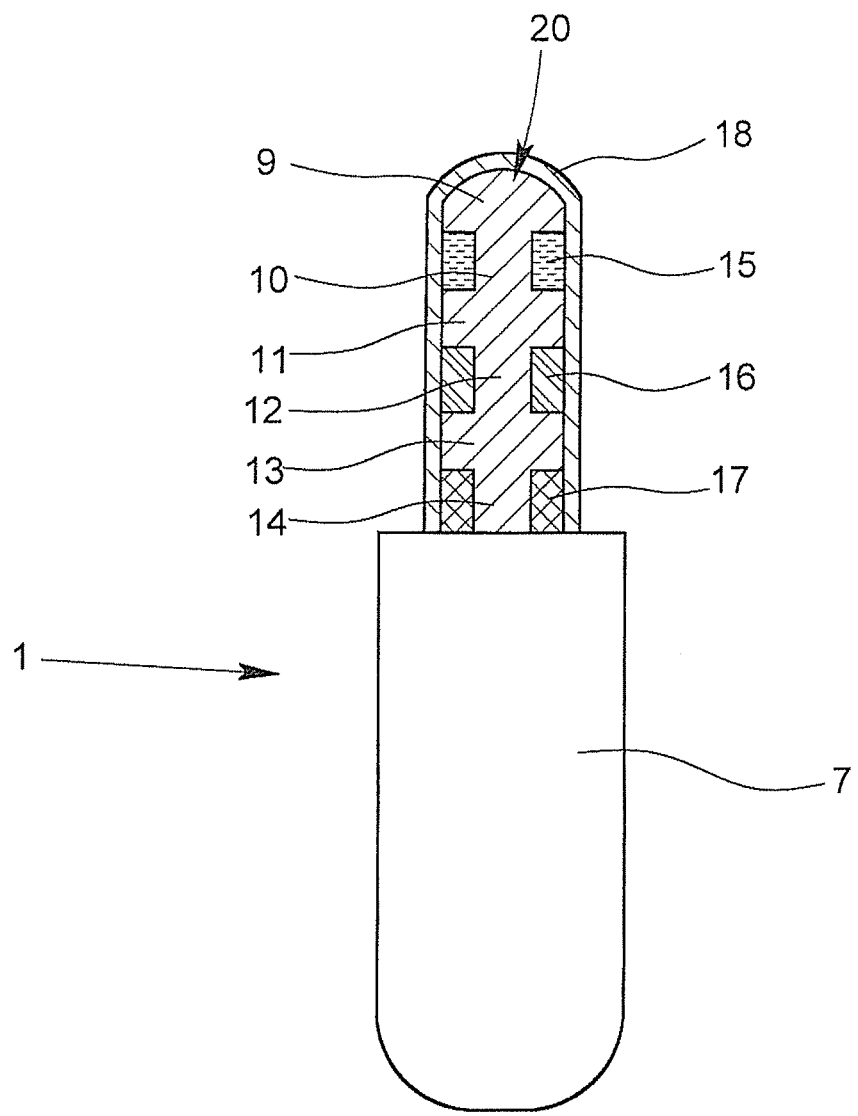
FIG. 4 is a side view of a further embodiment of a float according to the invention.

In the embodiment shown in FIG. 4, the level surface of the floating body 7 closest to the fill level measuring device 5, 6 is a part of the field attenuating structure 8 and the edge of the surface is not blunt, through which the damping characteristics are changed. The field attenuating structure 8 attached to the floating body 7, as opposed to the embodiments shown in FIGS. 2a, 2b, and 3a, is comprised of three discs 10, 12, 14 with small diameters and three discs 9, 11, 13 with large diameters. Each of the small discs 10, 12, 14 is surrounded by a ring 15, 16, 17 of another dielectric material, whose outer diameter corresponds essentially to the diameter of the large discs 9, 11, 13. The disc 9 with a large diameter that is closest to the fill level measuring device 5, 6 is curved and the entire attached field attenuating structure 8 is encased in a dielectric material 18.

Figure 5:
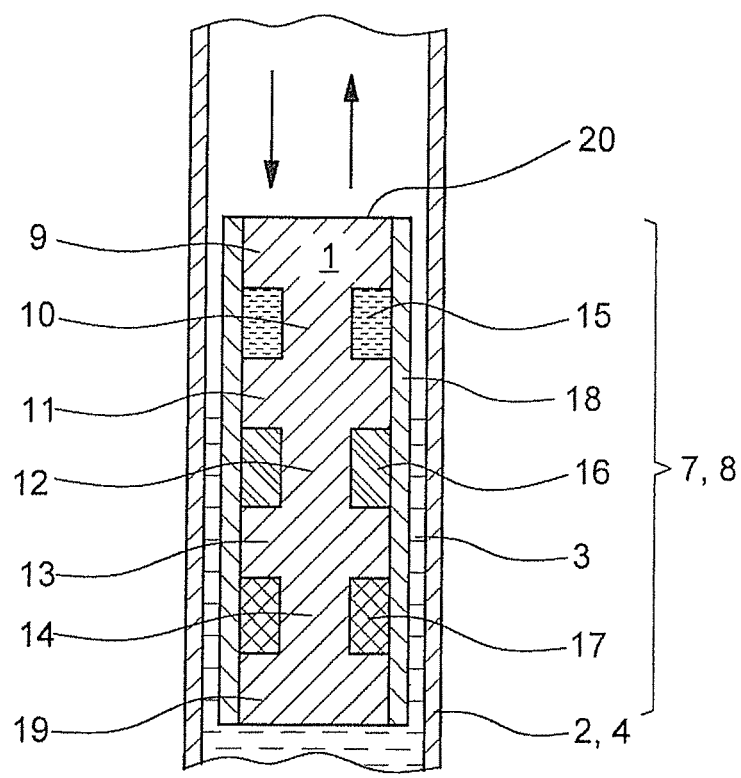
FIG. 5 is a side view of a final embodiment of a float according to the invention.

In the final embodiment shown in FIG. 5, the float 1 comprises a field attenuating device 8 that simultaneously also functions as the floating body 7. The field attenuating device 8 is circumferentially surrounded with a dielectric material 18.

What is claimed is:

1. Float for displaying the fill level of a medium in a container, the float, in use, being adapted for reflecting electromagnetic waves emitted from a transmitter toward a receiver, comprising:
   a floating body,
   a reflector at a top end of the float for reflecting electromagnetic waves, and
   a field attenuation structure below said reflector in a manner for attenuating electromagnetic waves interacting therewith,
   wherein said field attenuation structure comprises a first set of discs and a second set of discs arranged alternately one after the other in a longitudinal direction of the floating body and, wherein said first set of discs are larger than said second set of discs.

2. Float according to claim 1, wherein the field attenuation structure comprises a λ/4 filter.

3. Float according to claim 1, wherein said reflector and said field attenuation structure form said floating body and wherein at least said field attenuation structure is circumferentially surrounded by a dielectric material.

4. Float according to either claim 1, wherein each of the small discs is surrounded by a ring of a dielectric material, each ring surrounding said small discs having an outer diameter matched to the outer diameter of said large discs.

5. Float according to claim 4, wherein the reflector, said large discs of said field attenuation structure, and the rings surrounding the small discs of said field attenuation structure are surrounded by a casing of a dielectric material.

6. Fluid level measuring container, comprising:
   a main container body,
   a reference container section fluidically connected to the main container body in a manner causing fluid levels in the main container body and the reference container section to be the same,
   a float in said reference container section,
   a fill level measuring device comprising an electromagnetic wave transmitter and an electromagnetic wave receiver, said electromagnetic wave transmitter and electromagnetic wave receiver being positioned to propagate and receive electromagnetic waves along a longitudinal axis of the reference container section toward and from said float,
   wherein said float comprises:
   a floating body,
   a reflector facing toward said electromagnetic wave transmitter and electromagnetic wave receiver at a top end of the float for reflecting electromagnetic waves from said electromagnetic wave transmitter back toward said electromagnetic wave receiver, and a field attenuation structure positioned below the reflector in a manner for attenuating electromagnetic waves interacting therewith,
   wherein said field attenuation structure comprising a first set of discs and a second set of discs arranged alternately one after the other in a longitudinal direction of the floating body and, wherein said first set of discs are larger than said second set of discs.

7. Fluid level measuring container according to claim 6, wherein the discs have a thickness essentially equal to an uneven multiple of a quarter of the wavelength of electromagnetic radiation emitted from the transmitter.

8. Fluid level measuring container according to claim 6, wherein said field attenuation structure is connected to a top end of said floating body.

9. Fluid level measuring container according to claim 6, wherein the field attenuation structure comprises a λ/4 filter.

10. Fluid level measuring container according to claim 6, wherein said floating body is cylinder shaped.

11. Fluid level measuring container according to claim 6, wherein said reflector and said field attenuation structure form said floating body.

12. Fluid level measuring container according to claim 11, wherein at least said field attenuation structure is circumferentially surrounded by a dielectric material.

13. Fluid level measuring container according to claim 6, wherein each of the small discs is surrounded by a ring of a dielectric material, said rings surrounding said small discs having an outer diameter that matches an outer diameter of said large discs.

14. Fluid level measuring container according to claim 13, wherein said reflector, said large discs of said field attenuation structure, and said rings surrounding said small discs of said field attenuation structure are surrounded by a casing of a dielectric material.

* * * * *